Nov. 9, 1948.　　　A. L. CARILA　　　2,453,408
GRAIN TRIMMING DEVICE
Filed Nov. 30, 1945
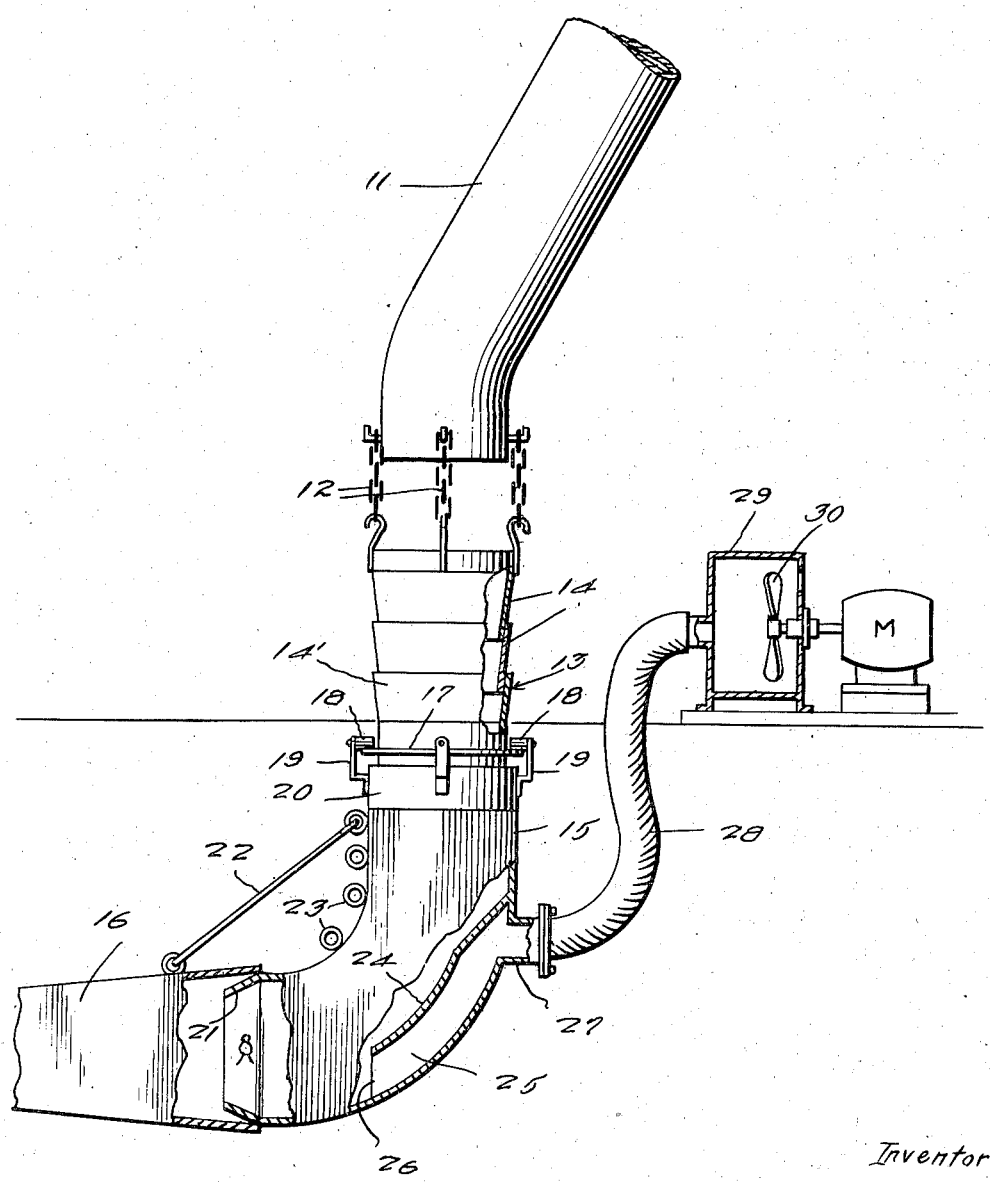
Inventor
A. L. Carila
Attorneys Patented Nov. 9, 1948

2,453,408

UNITED STATES PATENT OFFICE 2,453,408

GRAIN TRIMMING DEVICE

Alexander L. Carila, Norfolk, Va.

Application November 30, 1945, Serial No. 631,929

2 Claims. (Cl. 302—17)

This invention relates to grain loading devices, and more particularly to a device for loading grain into the hold of a vessel.

A main object of the invention is to provide a novel and improved loading device for grain wherein the proper distribution of the grain in the hold of a vessel will be greatly facilitated, said device being very simple in construction and being very easy to operate.

A further object of the invention is to provide an improved grain trimming device for loading grain into the hold of a ship, said device being adapted to direct grain from an elevator so as to be spread evenly and be properly distributed in the hold.

Further objects and advantages of the invention will appear from the following description and claims, and from the accompanying drawings, wherein:

The figure is a side elevational view, partly in section, of a grain trimming device constructed in accordance with the present invention.

Referring to the drawing, 11 indicates the lower end of a discharge spout leading from a grain elevator to a point immediately over the loading hatch of the ship's hold. Suspended from spout 11 by a plurality of chain elements 12 is a nozzle structure 13 comprising an inlet portion built up of a plurality of telescopically joined short tubular sections 14, an intermediate elbow portion 15 rotatably secured to the lowermost tubular section 14' and a discharge portion 16 pivotally secured to elbow portion 15.

The lowermost tubular section 14' is formed with a peripheral flange 17. Supported on flange 17 are a plurality of roller members 18, each roller member being rotatively carried by an offset bracket member 19 secured to the top portion 20 of elbow 15 so that elbow 15 may freely rotate axially with respect to tubular section 14'. Top portion 20 is circular in cross-section whereas the remainder of elbow 15 is rectangular in cross-section.

The outlet end of elbow 15 is tapered, as shown at 21 to permit angular adjustment in a vertical plane with respect thereto of pivotally secured discharge portion or conduit 16. Discharge portion 16 is rectangular in cross-section to fit the outlet end of elbow 15, sufficient looseness being provided at the abutting surfaces of discharge portion 16 and elbow 15 to allow ready angular adjustment of the discharge portion. The discharge portion 16 is supported and secured in adjusted position by a rod member 22 connected to portion 16 which may be engaged with any one of a plurality of eye members 23 provided on elbow 15.

Formed in the curved lower portion of elbow 15 is a partition 24 defining a rectangular passage 25 the forward end of which is substantially aligned with the forward vertical wall of the top portion of elbow 15, as shown at 26. The rearward end of passage 25 communicates with an outwardly projecting conduit portion 27 formed in the rearward curved wall of elbow 15, and this conduit portion 27 is connected by a hose 28 to a blower housing 29 mounted on the deck of the vessel and containing a blower fan 30 driven by a motor M.

In operation grain drops by gravity through discharge spout 11 and into nozzle structure 13. Grain in elbow 15 is blown forwardly by the blast of air entering passage 25 from blower housing 29. The grain may be directed in any desired manner by rotating elbow 15 around its vertical axis and adjusting the angular position of discharge portion 16 with respect to the elbow.

Since partition 24 extends forwardly to the vertical plane of the forward wall of the vertical portion of elbow 15, clogging of passage 25 by accumulation of grain in the upper portion of elbow 15 is substantially prevented and the grain may be effectively blown forwardly by the air blast.

While a specific embodiment of a grain trimming device for loading grain has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. In a device for loading grain from a grain elevator discharge spout into the hold of a ship, a vertically-disposed nozzle structure arranged at the discharge end of said spout and carried by the latter, an elbow of a rectangular cross-sectional area carried by said nozzle structure and mounted for rotation about a vertical axis coinciding with the vertical axis of the nozzle structure, a partition disposed in the lower curved portion of said elbow and spaced from the wall of the latter portion to define a passage for conveying air from a source of supply therethrough, said passage being so arranged in communication with said elbow as to facilitate discharge of the material from the discharge end of the elbow, and a discharge conduit pivotally connected to said elbow.

2. In a device for loading grain from a grain elevator discharge spout into the hold of a ship, a vertically-disposed nozzle structure arranged at the discharge end of said spout and carried by the latter, said nozzle structure embodying a plurality of telescopically-joined sections arranged in cooperative relation with said spout, an elbow of rectangular cross-sectional area carried by said nozzle structure and mounted for rotation about a vertical axis coinciding with the vertical axis of the nozzle structure, a partition disposed in the lower curved portion of said elbow and spaced from the wall of the latter portion to define a passage for conveying air from a source of supply therethrough, said passage being so arranged in communication with said elbow as to facilitate discharge of the material from the discharge end of the elbow, a discharge conduit pivotally connected to said elbow, and means carried by said discharge conduit and connectible with means on said elbow for maintaining the discharge conduit in its pivoted position.

ALEXANDER L. CARILA.

REFERENCES CITED

The following references are of record in the file of this patent:

UNITED STATES PATENTS

| Number | Name | Date |
|---|---|---|
| 187,536 | Kimball | Feb. 20, 1877 |
| 225,001 | Dougine | Mar. 2, 1880 |
| 641,045 | Schuman | Jan. 9, 1900 |
| 916,578 | Murphy | Mar. 30, 1909 |
| 936,245 | James | Oct. 5, 1909 |
| 1,184,860 | Lob | May 30, 1916 |
| 1,473,757 | Dorsey | Nov. 13, 1923 |